(12) United States Patent
Hammerschmidt et al.

(10) Patent No.: US 11,063,677 B2
(45) Date of Patent: Jul. 13, 2021

(54) METHODS AND APPARATUSES FOR SPEED AND/OR POSITION SENSING

(71) Applicant: Infineon Technologies AG, Neubiberg (DE)

(72) Inventors: Dirk Hammerschmidt, Finkenstein (AT); Erich Kolmhofer, Linz (AT); Rudolf Lachner, Ingolstadt (DE)

(73) Assignee: Infineon Technologies AG, Neubiberg (DE)

( * ) Notice: Subject to any disclaimer, the term of this patent is extended or adjusted under 35 U.S.C. 154(b) by 839 days.

(21) Appl. No.: 15/416,273

(22) Filed: Jan. 26, 2017

(65) Prior Publication Data

US 2017/0222738 A1 Aug. 3, 2017

(30) Foreign Application Priority Data

Jan. 29, 2016 (DE) .......................... 102016101595.4

(51) Int. Cl.
| | |
|---|---|
| *H04B 17/10* | (2015.01) |
| *G01S 13/50* | (2006.01) |
| *G01P 3/44* | (2006.01) |
| *H04B 17/27* | (2015.01) |
| *H01Q 1/22* | (2006.01) |
| *H01Q 1/24* | (2006.01) |
| *H01Q 1/42* | (2006.01) |
| *H01Q 21/00* | (2006.01) |

(52) U.S. Cl.
CPC .............. *H04B 17/103* (2015.01); *G01P 3/44* (2013.01); *G01S 13/50* (2013.01); *H01Q 1/2283* (2013.01); *H01Q 1/24* (2013.01); *H01Q 1/42* (2013.01); *H01Q 21/00* (2013.01); *H04B 17/27* (2015.01)

(58) Field of Classification Search
CPC ....... H04B 17/103; H04B 17/27; G01S 13/50; G01S 13/881; G01P 3/44; G01P 3/487; G01P 3/488; H01Q 1/2283; H01Q 1/24; H01Q 1/42; H01Q 21/00
USPC ........... 342/107, 464, 357.32, 195, 100, 103
See application file for complete search history.

(56) References Cited

U.S. PATENT DOCUMENTS

| | | | |
|---|---|---|---|
| 37,986,414 | | 3/1974 | Constant |
| 4,319,244 A | * | 3/1982 | Hirota ..................... G01S 13/92 342/104 |
| 5,371,718 A | | 12/1994 | Ikeda |
| 8,504,321 B2 | | 8/2013 | Seidel |
| 2004/0168512 A1 | * | 9/2004 | McEwan ............. G01M 17/027 73/146 |

(Continued)

FOREIGN PATENT DOCUMENTS

| | | |
|---|---|---|
| DE | 4311686 A1 | 10/1993 |
| DE | 19928624 A1 | 1/2001 |

(Continued)

*Primary Examiner* — Bo Fan
(74) *Attorney, Agent, or Firm* — Eschweiler & Potashnik, LLC

(57) ABSTRACT

Embodiments relate to machines comprising a movable part, transceiver circuitry configured to transmit a radio signal towards the movable part and to receive a reflection of the radio signal from the movable part, evaluation circuitry configured to determine a position or a speed of the movable part based on at least the received radio signal. A distance between an antenna of the transceiver circuitry and the movable part is less than 5 cm.

22 Claims, 5 Drawing Sheets

(56) References Cited

U.S. PATENT DOCUMENTS

2015/0114096 A1* 4/2015 Eichel ................... G01S 13/88
73/114.25

FOREIGN PATENT DOCUMENTS

| DE | 102013016115 A1 | 3/2015 |
| DE | 102014017917 B3 | 11/2015 |
| WO | 03027709 A1 | 4/2003 |
| WO | 2016/087010 A1 | 6/2016 |

* cited by examiner

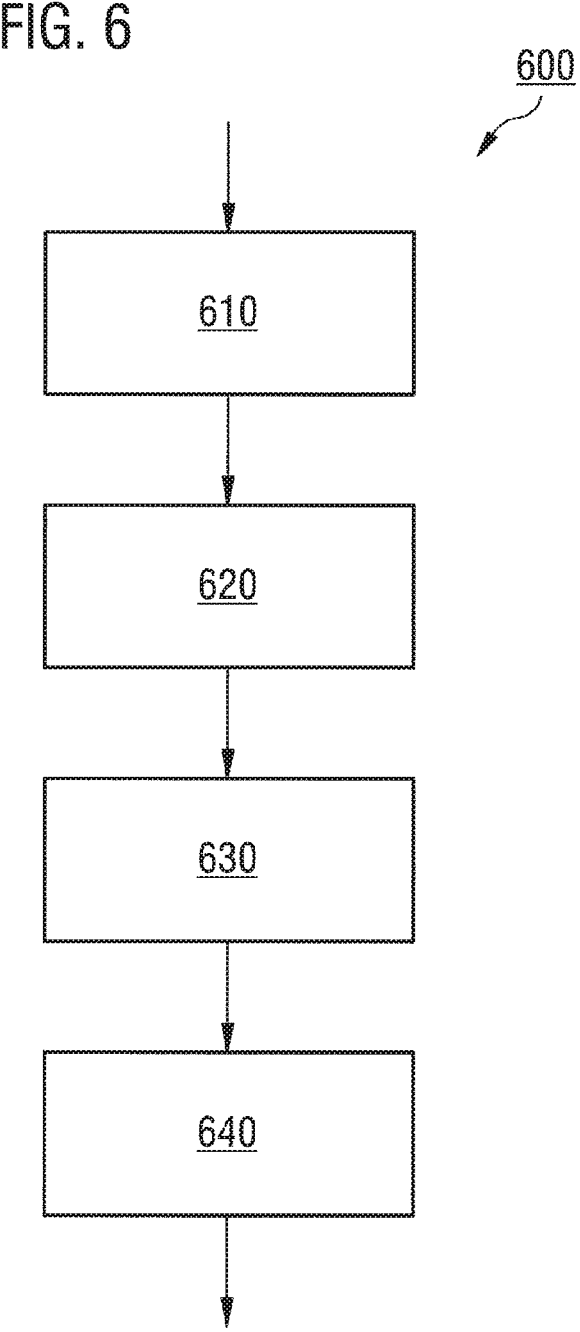

METHODS AND APPARATUSES FOR SPEED AND/OR POSITION SENSING

CROSS REFERENCE TO RELATED APPLICATIONS

This application claims priority to German Patent Application number 10 2016 101 595.4 filed on Jan. 29, 2016 in the name of Dirk Hamerschmidt, et al., entitled "Methods and Apparatuses for Speed and/or Position Sensing" and is hereby incorporated in its entirety.

FIELD

Embodiments relate to methods and apparatuses for speed and/or position sensing and, more particularly, for highly accurate speed and/or position sensing for automotive applications, for example.

BACKGROUND

Numerous vehicular, industrial and consumer applications rely on magnetic sensors. Examples of such applications include speed sensing applications such as wheel speed, transmission speed, crankshaft and camshaft sensing. Wheel speed sensor Integrated Circuits (ICs) may be used to measure the speed of each wheel and detect whether a wheel blocks during breaking (ABS). This measurement may be used as basic input signals for a car's Electronic Stability Program (ESP). Magnetic angle sensors and linear Hall sensors may also be used to measure steering angle and steering torque, for example. It is known to use Hall and magneto-resistive sensing elements for monolithically integrated magnetic sensors.

Magnetic field applications cause additional cost on the application side due to the need of magnetic pole wheels or ferromagnetic tooth wheels and back-bias magnets. Hence, there is a desire to reduce sensor costs in above mentioned vehicular, industrial and consumer applications.

SUMMARY

Embodiments of the present disclosure propose object-detection sensors that rely on radio waves to determine position and/or speed of movable objects and to apply the proposed sensors in speed and/or angle sensing applications. In some embodiments, a distance between a transceiver and a movable object will be relatively small, for example, in the range of millimeters (mm) or a few centimeters (cm). Therefore, a radio transceiver may generate a radio signal with only a small electric power in the micro-Watt ($\mu$M) range.

According to a first aspect of the present disclosure it is provided a machine. The machine comprises a movable part. The machine further comprises transceiver circuitry including at least one antenna. A distance between the antenna and the movable part is less than 5 cm. The transceiver circuitry is configured to transmit a radio signal towards the movable part and to receive a reflection of the radio signal from the movable part. The machine yet further comprises evaluation circuitry configured to determine a position and/or a speed of the movable part based on at least the received reflected radio signal.

In some examples, the transceiver circuitry is configured to transmit the radio signal with an electrical power of less than 100 $\mu$W.

In some examples, the transceiver circuitry comprises an antenna array and the evaluation circuitry is further configured to determine a rotational direction of the movable part based on a combination of received signals of different antenna elements of the antenna array.

In some examples, the transceiver circuitry and the evaluation circuitry are integrated in a common semiconductor package or chip.

In some examples, the movable part and transceiver circuitry are commonly arranged in shielded housing.

In some examples, adjacent surface portions of the movable part are configured for alternating electromagnetic reflectivity for the radio signal.

In some examples, the movable part is a rotatably movable part and the evaluation circuitry is configured to determine a rotational position or a rotational speed of the movable part based on at least the received radio signal.

In some examples, the movable part comprises a rotationally symmetric cross-section in a plane perpendicular to the movable part's rotational axis.

In some examples, the movable part is a wheel, a disc, or a shaft.

In some examples, the movable part comprises a rotationally asymmetric cross-section in a plane perpendicular to the movable part's rotational axis.

In some examples, a ratio between a smallest and a largest diameter of the movable part in the plane is smaller than 0.9.

In some examples, the evaluation circuitry is configured to determine the position or the speed of the movable part based on variation of the received signal's power or a phase difference between the transmitted and received radio signal.

In some examples, the machine is a vehicle.

According to a second aspect of the present disclosure it is provided an integrated sensor circuit. The integrated sensor circuit comprises transceiver circuitry configured to transmit a radio signal having an electrical power of less than 100 $\mu$W towards a movable object and to receive a reflection of the radio signal from the movable object. The integrated sensor circuit further comprises evaluation circuitry configured to determine a position and/or a speed of the movable object based on at least the received reflected radio signal.

According to a further aspect of the present disclosure, it is provided a method for position and/or a speed sensing. The method includes moving an object relative to at least one antenna of a transceiver, wherein a distance between the antenna and the movable object is (and remains) less than 5 cm. The method also includes transmitting a radio signal from the transceiver towards the movable object and receiving, at the transceiver, a reflection of the radio signal from the movable object. A position and/or a speed of the object is determined based on at least the received radio signal.

In some examples, the position or the speed of the movable object is determined based on variation of the received signal's power or a phase difference between the transmitted and received radio signals.

In some examples, the radio signal is transmitted with an electrical power of at most 100 $\mu$W.

In some examples, transmitting, receiving, and determining take place in a machine and wherein the object is a rotating component of the machine.

In some examples, the method further includes forwarding the position or the speed to an electronic control unit of a vehicle.

In some examples, forwarding the position or speed comprises generating signal pulses, wherein edges of the signal pulses correspond to structures of the object.

In some examples, the object is at least one of a crank shaft, a cam shaft, or a wheel axis.

According to yet a further aspect of the present disclosure, it is provided a machine. The machine comprises a movable part, transceiver circuitry configured to transmit a radio signal towards the movable part and to receive a reflection of the radio signal from the movable part, and evaluation circuitry configured to determine a position and/or a speed of the movable part based on at least the received radio signal. Adjacent surface portions of the movable part are configured to cause or generate different amplitudes of the reflected radio signal.

In some examples, a first electromagnetic reflectivity for the radio signal of a first surface portion differs from a second electromagnetic reflectivity for the radio signal of an adjacent second surface portion.

In some examples, the first electromagnetic reflectivity differs from the second electromagnetic reflectivity by more than 5% of the first or the second electromagnetic reflectivity.

In some examples, a shortest distance between a first surface portion of the movable part and an antenna of the transceiver circuitry differs from a shortest distance between an adjacent second surface portion of the movable part and the antenna of the transceiver circuitry.

In some examples, the shortest distance between the first surface portion and the antenna differs from the shortest distance between the adjacent second surface portion and the antenna by more than 5%.

In some examples, a distance between an antenna of the transceiver circuitry and the movable part is less than 5 cm.

According to yet another further aspect of the present disclosure, it is provided a machine. The machine comprises a rotatably movable part having a rotationally asymmetric cross-section in a plane perpendicular to the movable part's rotational axis. The machine also comprises transceiver circuitry configured to transmit a radio signal towards the movable part and to receive a reflection of the radio signal from the movable part and evaluation circuitry configured to determine a rotational position and/or a rotational speed of the movable part based on at least the received radio signal.

In some examples, a ratio between a smallest and a largest diameter of the movable part in the plane is smaller than 0.9.

In some examples, a distance between an antenna of the transceiver circuitry and the movable part is less than 5 cm.

BRIEF DESCRIPTION OF DRAWINGS

Some embodiments of apparatuses and/or methods will be described in the following by way of example only, and with reference to the accompanying figures, in which

FIG. 6 illustrates a high-level flowchart of a method for position and/or a speed sensing according to an embodiment.

DETAILED DESCRIPTION

Figure 1A:
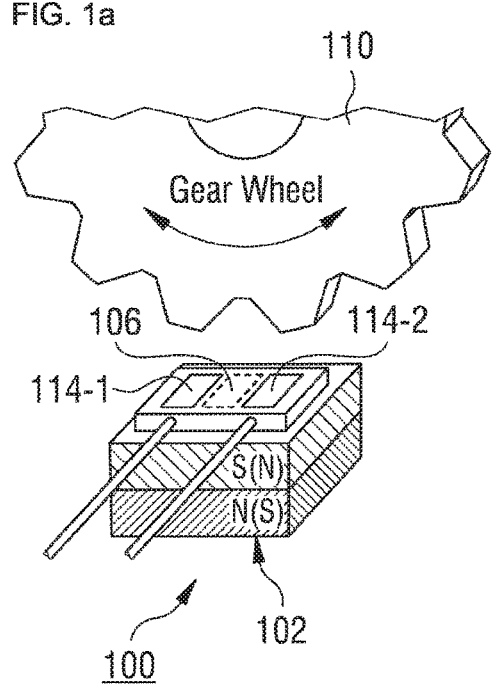
FIGS. 1a and 1b illustrate examples of incremental magnetic field sensing.

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

Some embodiments of the present disclosure propose to measure rotational speed or position based on structured targets using a radar system instead of magnetic field sensors. For example, automotive radar is currently used for distance measurements in a scale range from a few tens of centimeters to a few hundred meters. Embodiments propose a complete new concept for speed or angle sensors currently in vehicles or other machines utilizing measurements in the sub-centimeter or even sub-millimeter range by low power radar sensors of low complexity. As such, this new concept is capable to replace conventional magnetic sensors used for speed or angle sensors thereby decreasing system costs.

Magnetic incremental field measurement is well established. Two example principles of magnetic sensing are shown in FIGS. 1a and b.

In the example of FIG. 1a, a magnetic sensor 100 is used to detect a position and/or speed of a rotatably movable ferromagnetic tooth or gear wheel 110. The magnetic sensor 100 comprises a back bias magnet 102 to generate a bias magnetic field which is influenced by the moving gear wheel 110. Further, the magnetic sensor 100 comprises first and second magnetic sensor elements 104-1, 104-2 to sense variations of the bias magnetic field due to the gear wheel 110. Examples of magnetic sensor elements are Hall sensor or magneto-resistive sensor elements. Optional signal processing circuitry 106 may further process the signals provided by the magnetic sensor elements 104-1, 104-2. Due to the differential setup of the magnetic sensor elements 104-1, 104-2 also a rotational direction of the gear wheel 110 can be detected, for example, based on phase differences between signals of the first and second magnetic sensor elements 104-1, 104-2. Output signals of the magnetic sensor 100 may be fed to an Electronic Control Unit (ECU) of a vehicle, for example.

Figure 1B:
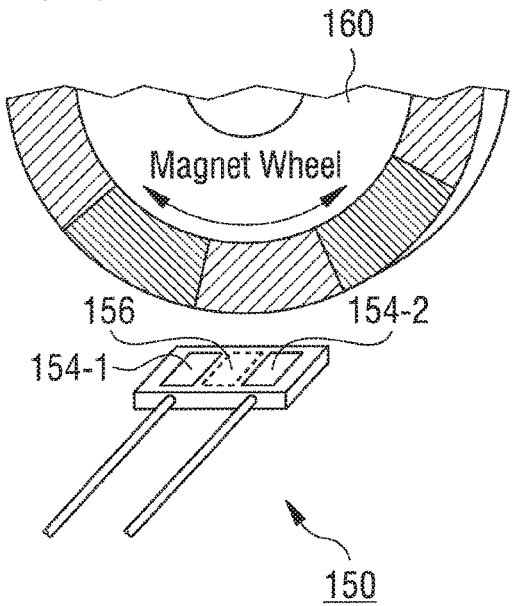

A different setup for magnetic incremental speed/position sensing is shown in FIG. 1b. In this example, a magnetic sensor 150 is used to detect a position and/or speed of a rotatably movable magnetic encoder wheel (magnetic pole wheel) 160 comprising alternating magnetic poles in circumferential direction. The magnetic sensor 150 comprises first and second magnetic sensor elements 154-1, 154-2 to sense variations of the magnetic field originating from the rotating encoder wheel 160. Again, examples of magnetic sensor elements are Hall sensor or magneto-resistive sensor elements. An optional signal processing circuitry 156 may further process the signals provided by the magnetic sensor elements 154-1, 154-2. Due to the differential setup of the magnetic sensor elements 154-1, 154-2 also a rotational direction of the encoder wheel 160 can be detected. Output signals of the magnetic sensor 150 may be fed to an Electronic Control Unit (ECU) of a vehicle, for example.

The magnetic sensing setups of FIG. 1 may be used in automotive applications including angle sensing applications or speed sensing applications such as wheel speed, transmission speed, crankshaft and camshaft sensing. However, such magnetic field applications cause additional cost and/or space requirements on the application side due to the need of magnetic pole wheels or ferromagnetic tooth wheels and back bias magnets.

Embodiments of the present disclosure therefore propose a complete new concept utilizing radar sensors for angle and/or speed sensing applications. As will be appreciated by the skilled person having benefit from the present disclosure, a tooth wheel could be made simpler in case of a radar, e.g., a plastic tooth wheel or a disc with a printed metal pattern that changes the reflectivity. In applications related to gear boxes or transmissions, conventional tooth wheels can be used together with radar sensors for rotational speed sensing. Compared to magnetic sensors, these tooth wheels do not have to be ferromagnetic or have back-bias magnets installed.

Automotive radar is currently used for distance measurements in a larger scale range d=1 . . . 200 m. The price per radar system is rapidly decreasing and a reduction of a radar system to the requirements of a very short distance measurement (e.g., d=1 . . . 5 mm) needed for the targeted applications would allow a further cost down due to reduced power consumption ($\sim d^{-4}$). On top of this, the change of the application from a linear distance measurement to a binary pattern detection would allow a further simplified design of the radar system. This indicates that the cost scaling function of radar systems for incremental speed and position sensors should be much more aggressive than the one of magnetic ones. Consequently, a cost situation that can initiate a replacement of magnetic field sensors by radar systems could be reached.

Figure 2:
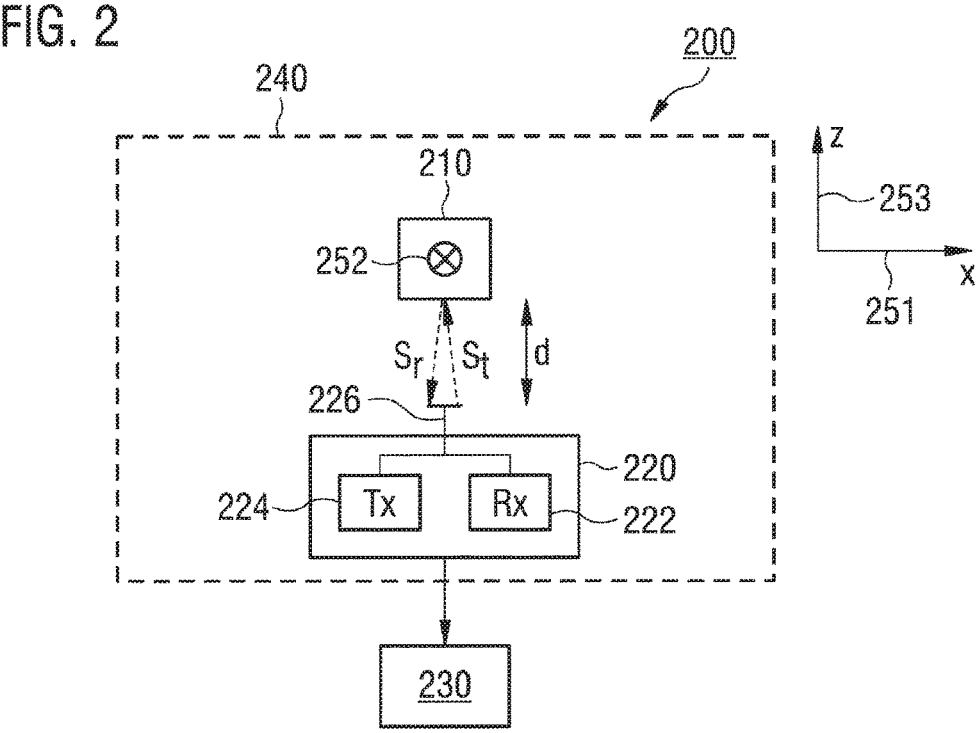
FIG. 2 shows a diagram of a sensing system according to an embodiment.

Turning now to FIG. 2, a high-level block diagram of a system or a machine 200 according to an embodiment is shown.

The machine 200 comprises a movable part 210, transceiver circuitry 220, and evaluation circuitry 230. Transceiver circuitry 220 comprises transmitter and receiver circuitry 222, 224 as well as at least one antenna 226. A distance d between the at least one antenna 226 and the movable part 210 is less than 5 cm. In some embodiments, the distance d may be even smaller, for example, smaller than 3 cm, smaller than 1 cm, or even smaller than 5 mm. The distance d may be understood as the shortest distance between a surface portion of movable part 210 facing antenna 226 and antenna 226. Transceiver circuitry 220 is configured to transmit a modulated or unmodulated radio signal $s_t$ towards the movable part 210 and to receive a reflection $s_r$ of the radio signal from the movable part 210. Evaluation circuitry 230 is configured to determine a position and/or a speed of the movable part 210 based on at least the received radio signal $s_r$. In some embodiments, the position and/or speed may also be determined based on a combination of transmit signal $s_t$ and received/reflected signal $s_r$.

The machine 200 can be a vehicle, such as a car, in some embodiments. However, the skilled person having benefit from the present disclosure will appreciate that the machine 200 could be any machine using sensor equipment for motion detection of one or more movable parts of the machine. That is to say, the machine 200 could also be an industrial machine, a household machine or the like.

According to embodiments, transceiver circuitry 220 makes use of the radar principle. Radar is an object-detection system that uses radio waves to determine properties of objects. Transmitter circuitry 224 transmits radio waves or microwaves that reflect from the movable part 210 in their path. Receiver circuitry 222, which may be monolithically integrated with transmitter circuitry 224, receives and processes these reflected waves to determine properties of the movable part 210. Transceiver circuitry 220 may comprise further analog and/or digital hardware components such as power supply circuitry, electronic oscillator circuitry, modulator circuitry, amplifier circuitry and/or impedance matching circuitry.

Transceiver circuitry 220 may be a monolithically Integrated Circuit (IC) implemented in a single semiconductor package or chip. In some embodiments, also the at least one antenna 226 and/or evaluation circuitry 230 may be a structure monolithically integrated with transceiver circuitry 220. In particular for high radio frequencies of the radio signal $s_t$ monolithic integration of antenna 226 may be a desirable option. In some embodiments, transceiver circuitry 220 may be configured to generate the radio signal $s_t$ with a radio frequency of at least 20 GHz. In some embodiments, transceiver circuitry 220 may be configured to generate the radio signal $s_t$ with a radio frequency of at least 60 GHz. Depending on the application and/or the surroundings, even higher frequencies may be used, such as radio frequency higher than 100 GHz or even higher than 200 GHz.

A radar sensor IC according to embodiments may be packaged in a 2-pin package which may be compatible to conventional magnetic sensor packages. This may lead to transparency for downstream located signal processing entities, such as Electronic Control Units (ECUs), for example, with respect to the employed sensor technology. That is to say, an ECU would not recognize whether it receives the signal from a magnetic sensor or from a radar sensor instead. Hence, in some embodiments, evaluation circuitry 230 may be configured to forward the position and/or the speed to an ECU of a vehicle for further processing.

Due to the relatively small distance d between the at least one antenna 226 and the movable part 210, transceiver circuitry 220 may be configured for small electric power. For example, transceiver circuitry 220 may be configured to transmit the radio signal $s_t$ with an electrical power of less than 100 µW. Depending on the distance d, the electrical power of signal $s_t$ may be even lower. In some embodiments, the electrical power of signal $s_t$ may be less than 50 µW or even less than 10 µW.

Thus, some embodiments also provide an integrated sensor circuit comprising transceiver circuitry configured to transmit a radio signal having an electrical power of less than 100 µW (less than 50 µW or even less than 10 µW) towards a movable object and to receive a reflection of the radio signal from the movable object, and evaluation circuitry configured to determine a position and/or a speed of the movable object based on at least the received radio signal.

As indicated in FIG. 2, the machine's movable part 210 and transceiver circuitry 220 may be arranged in a common shielded housing 240 in order to better isolate the devices from the outside. Thus, harmful electromagnetic interference to/from the signals $s_t$ and/or $s_r$ may be reduced or even completely eliminated. Conventional automotive radar systems for distance measurement are known to use a radio frequency of 77 GHz, for example. In embodiments where transceiver circuitry 220 also employs the same radio frequency the shielded housing 240 covering both the machine's movable part 210 and transceiver circuitry 220 may be useful to reduce interference to/from such conventional automotive ranging systems.

In some embodiments, the distance d between the at least one antenna 226 and an axis of movement of movable part 210 will remain substantially unchanged. While a position of transceiver circuitry 220 and/or at least one antenna 226 may be fixed, movable part 210 may be configured for a linear (e.g. lateral) or rotational movement relative to the antenna 226 of transceiver circuitry 220. Taking the example of FIG. 2, movable part 210 could, for example, laterally move along x-axis 251 or rotate around y-axis 252. Note that block 210 is only a placeholder for a variety of movable part with different possible geometries.

In some embodiments, movable part 210 may be a rotatably movable object, such as a wheel, a disc, or a shaft (e.g. crankshaft or camshaft), for example. In this case evaluation circuitry 230 may be configured to determine a rotational position and/or a rotational speed of movable part 210 based on at least the received radio signal $s_r$. For example, evaluation circuitry 230 may be configured to determine the position and/or the speed of movable part 210 based on variation of the reflected signal's $s_r$ power or amplitude. Additionally or alternatively, a combination of both signals $s_t$ and $s_r$ may be used. For example, evaluation circuitry 230 may be configured to determine the position and/or the speed of movable part 210 based on a phase difference between the transmitted and reflected radio signals $s_t$ and $s_r$. In the latter case, an optional modulation of the transmitted signal may be helpful.

In some embodiments, for example related to speed sensing, movable part 210 may comprise a rotationally symmetric cross-section in a plane perpendicular to the movable part's rotational axis 252. In the example of FIG. 2, this plane would be the x-z plane. In other embodiments, for example related to angle sensing, movable part 210 may comprise a rotationally asymmetric cross-section in a plane (e.g., x-z plane) perpendicular to the movable part's rotational axis 252. A difference between a smallest and largest diameter may be significant for both, rotationally symmetric or rotationally asymmetric cross-sections. That is, a ratio between a smallest and a largest diameter of the movable part in the plane may be smaller than 0.9.

After having explained some general aspects of the present disclosure, we will now turn to some more specific examples.

Figure 3:
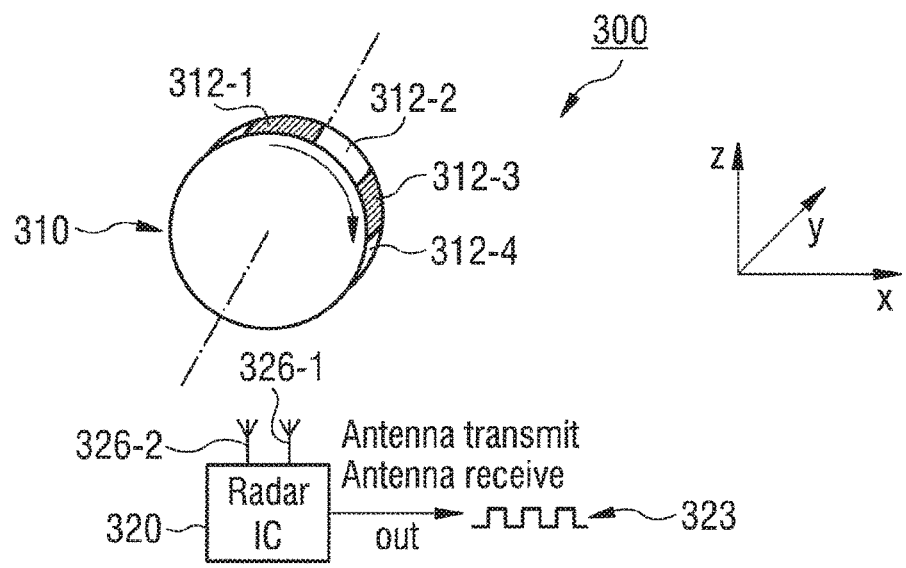
FIG. 3 shows an example for a radio wave based incremental speed sensor.

FIG. 3 shows transceiver circuitry 320 with a transmit antenna 326-1 and a receive antenna 326-2 in close proximity (smaller than 5 cm or even smaller than 1 cm in some embodiments) to an encoder wheel or disc 310. In some embodiments, it may also be possible to use only one single antenna together with a duplexer to separate transmit and receive paths. Encoder wheel 310 has a rotationally symmetric cross-section in the x-z plane perpendicular to the movable part's rotational axis (y-axis). Here, antennas 326-1, 326-2 are positioned radially outward from encoder wheel 310 such that the radio signal $s_t$ is reflected by an outer annular skin surface of movable part 310 extending parallel to the movable part's rotational axis.

The movable part's outer annular skin surface comprises, in circumferential direction, adjacent surface portions 312-1, 312-2, 312-3, 312-4 that are configured for alternating electromagnetic reflectivity for the radio signal emitted from transceiver circuitry 320. A first electromagnetic reflectivity for the radio signal of the first surface portion 312-1 differs from a second electromagnetic reflectivity for the radio signal of the adjacent second surface portion 312-2. This may be done by using different surface materials for the adjacent surface portions, for example. For example, the first electromagnetic reflectivity may be obtained by metallization, while the second electromagnetic reflectivity may be obtained without metallization. The different electromagnetic reflectances cause or generate respective different amplitudes of the received radio signal. An electromagnetic reflectivity for the radio signal of a third surface portion 312-3 adjacent to the second surface portion 312-2 may correspond to the first electromagnetic reflectivity of the first surface portion 312-1. An electromagnetic reflectivity for the radio signal of a fourth surface portion 312-4 adjacent to the third surface portion 312-3 may correspond to the second electromagnetic reflectivity of the second surface portion 312-2, and so on. In this way, a periodically oscillating output signal 323 with high and low values may be obtained upon rotation of wheel 310. A high output signal value may correspond to a surface portion 312 with high electromagnetic reflectivity, while a low output signal value may correspond to a surface portion 312 with low electromagnetic reflectivity, for example. In some embodiments, the first electromagnetic reflectivity may substantially or significantly differ from the second electromagnetic reflectivity, for example by at least 5% of the first or the second electromagnetic reflectivity. That is, a ratio between the first electromagnetic reflectivity and the second electromagnetic reflectivity may be smaller than 0.95 (or larger than 1.05). For more significant amplitude oscillations of receive signal $s_r$ and/or output signal 323, the ratio between the first electromagnetic reflectivity and the second electromagnetic reflectivity may be smaller than 0.5 (or larger than 1.5), for example.

In the example of FIG. 3, the radar IC 320 may measure the amplitude modulation/variation of the power of the receive signal $s_r$, which is reflected by the structured target wheel 310. The amplitude variation is caused by the change of the reflectivity between adjacent surface portions 312-1, 312-2, 312-3, 312-4. The alternating reflectivity can e.g. be caused by metal plating on a plastic wheel. The skilled person having benefit from the present disclosure will appreciate that various other options for alternating reflectivity are possible.

FIG. 4 illustrates further example embodiments, where adjacent surface portions of movable parts are configured to cause or generate different amplitudes of the received radio signal.

Figure 4A:
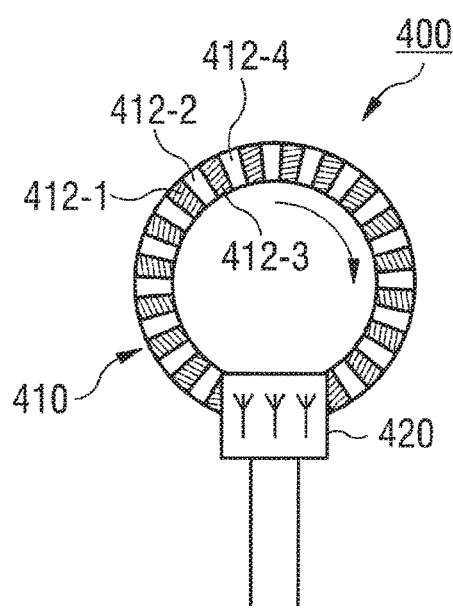
FIGS. 4a and 4b show further examples of radio wave based sensing systems using rotationally symmetric movable parts.

FIG. 4a shows an annular face of a movable part 410, such as a ring, disc or a shaft. Similar to the embodiment of FIG. 3, the movable part's annular face comprises adjacent surface portions 412-1, 412-2, 412-3, 412-4 arranged in circumferential direction that are configured for alternating electromagnetic reflectivity for a radio signal emitted from transceiver circuitry 420. In the example of FIG. 4, transceiver circuitry 420 including antennas 426 is arranged in front of the movable part's annular face. Based on the x-, y-, z-coordinate system of FIG. 3, the radio signal $s_t$ is transmitted in y-direction from transceiver circuitry 420 to the annular face. At the same time the movable part's rotational axis also extends along y-direction. However, there may be a radial offset between the rotational axis and the position of transceiver circuitry 420. Hence, also a disc 410 may be used instead of a wheel and the IC 420 with the antennas 426 may be placed in front of the disc.

Figure 4B:
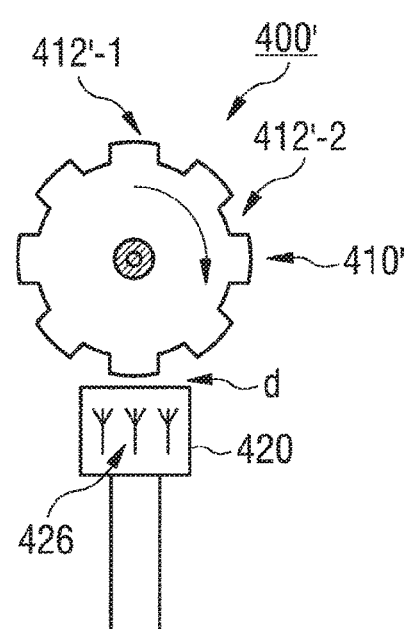

FIG. 4b shows an annular face or a cross section of a movable part 410', such as a tooth or gear wheel. Movable part 410' comprises a plurality of teeth 412'-1 separated by gaps 412'-2 along its circumference. Gear wheel 410' has a rotationally symmetric cross-section in the x-z plane perpendicular to the movable part's rotational axis (y-axis). The antennas 426 are positioned radially outward from gear wheel 410' such that the radio signal $s_t$ is reflected by an outer skin surface of gear wheel 410' extending parallel to the movable part's rotational axis. The teeth 412'-1 and gaps 412'-2 of the gear wheel's skin surface provide adjacent surface portions in circumferential direction that are arranged in alternating distances from the wheel's rotational axis. This also leads to alternating (shortest) distances between the respective adjacent surface portions 412'-1, 412'-2 and the antennas 426 of transceiver circuitry 420. That is to say, a shortest distance (first distance) between a first surface portion 412'-1 of the movable part 410' and an antenna 426 of transceiver circuitry 420 may differ from a shortest distance (second distance) between an adjacent second surface portion 412'-2 of the movable part and the antenna 426 of transceiver circuitry 420. The skilled person will appreciate that the first and second distances may refer to distances when a tooth 412'-1 or a gap 412'-2 in FIG. 4b directly face the one or more antennas 426, respectively. In the example depiction of FIG. 4a, a tooth faces the one or more antennas 426.

In some embodiments, the first distance may differ from the second distance by more than 5% of the first or the second distance. That is, a ratio between the first distance and the second distance may be smaller than 0.95 (or larger than 1.05). For more significant amplitude oscillations of receive signal $s_r$, the ratio between the first distance and the second distance may be smaller than 0.5 (or larger than 1.5), for example. Note that the adjacent radially offset surface portions 412'-1 and 412'-2 of movable part 410' may be of the same electromagnetic reflectivity. Optionally, however, they may be of different electromagnetic reflectivity for further enhancing the reflected signal's variation.

Hence, in some embodiments, a tooth wheel may be used instead of a metal printed wheel and the modulation appears due to the changes of the distance instead of the change in the material reflectivity.

Embodiments can be combined in different ways. For example, an antenna array with spatial distance may be used to detect rotation direction additional to speed by evaluation of a phase shift between the received signals of adjacent antennas. Thus, a transceiver circuit according to embodiments may comprise an antenna array. The evaluation circuit may be further configured to determine a rotational direction of the movable part based on a phase shift between received signals of different antenna elements of the antenna array. While the phase shift may be of certain sign for clockwise rotation, the phase shift may be of opposite sign in case of counter-clockwise rotation. In some embodiments the antenna array may be multiplexed, for example, each antenna can be used to transmit or receive. In some embodiments, antennas can be integrated in the package or on the chip. In the latter case it may be advantageous to go to frequencies of 200 GHz or more in order to reduce the antenna structure size. The ability to receive modulated data on a 200 GHz carrier (the result of the above described setup is the same) is already given with nowadays CMOS communication ICs.

The person having benefit from the present disclosure will appreciate that also more complex radar principles than evaluating the amplitude/power of a received reflected radar wave could be used. For example, the distance to the reflecting object could be evaluated which is one of the classical radar measurements of a pulse radar or a Frequency Modulated Continuous Wave (FMCW) radar. For the measurement at a tooth wheel also a Continuous Wave (CW) radar with an evaluation of the Doppler effect could be used, which would deliver a speed signal, because at the edge of an approaching tooth the surface of the target moves towards the radar sensor (positive speed pulse) and at the edge of an approaching gap the surface of the target moves away from the sensor and delivers a negative speed pulse. Thus, there are various alternatives making use of different radar principles.

Figure 7:
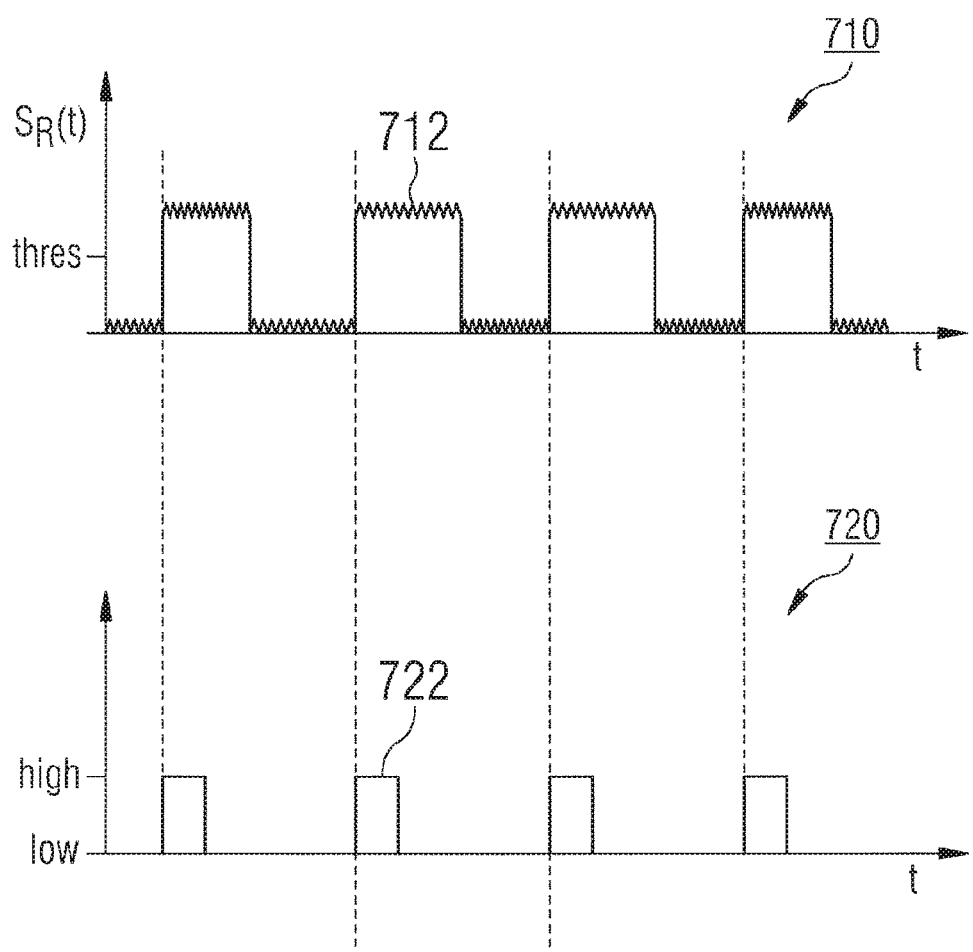
FIG. 7 illustrates an example of a reflected signal related to example embodiments for speed sensing.

FIG. 7 illustrates an example of a reflected signal $s_r$, related to example embodiments for speed sensing.

The upper signal course 710 may, for example, be obtained by down-converting a received radar signal which has been reflected by a moving (e.g., rotating) movable part with adjacent surface portions of different reflectivity. The signal down-conversion from the RF domain, which may be performed in a radar IC, may result in a potentially noisy analog or digital Intermediate Frequency (IF) or baseband radar signal 712 with varying amplitude and/or phase. The radar signal 712 may optionally be filtered for noise suppression or reduction. In the illustrated example, radar signal portions with higher amplitude may correspond to portions of the movable part with higher reflectivity, while signal portions with lower amplitude may correspond to portions of the movable part with lower reflectivity.

The signal course 720 in the lower portion of FIG. 7 depicts an example of a radar sensor output signal 722. Whenever the amplitude of radar signal 712 surpasses a predefined signal threshold thres, an output signal pulse 722 may be generated and sent towards an ECU, for example. Thus, in the illustrated example the rising signal edge and a predefined signal threshold is used to generate an output signal pulse, leading to a binary sensor output signal with levels 'high' and 'low'. The skilled person having benefit from the present disclosure will appreciate that also other methods of generating sensor output signals are possible. For example, also falling signal edges and/or zero crossings of signal 712 may be used as triggers for output signal pulses.

In yet further embodiments, signal course 710 could also represent phase differences between a reference signal and a received radar signal. Different phase differences may be indicative of different times of flight of a radar signal and thus different portions of a moving (e.g., rotating) movable part. Also in such examples sensor output signal 722 may be generated or triggered based on exploring/extracting signal edges and/or threshold values and/or zero crossings of the phase difference signal.

In some embodiments, switching threshold values for triggering sensor output signal pulses may also be adaptive. For example, threshold values may be adaptable to different materials and/or shapes of the movable object/part. In some implementations, the switching threshold value(s) may be adapted via a learning algorithm and thus provide (self-) calibration and/or hysteresis concepts, for example. There may be different hysteresis concepts implemented in a radar sensor IC. One form of hysteresis for suppression of undesired switching caused by noise in the signal may be referred to as hidden hysteresis. This means, that one cannot observe a hysteresis from outside. If the value of the switching threshold/level does not change, the sensor output always switches at the same level. But inside an IC there may be two distinct levels close above and below the switching level, which may be used to arm the output. In other words if the value of the received radar signal crosses the lower of this hysteresis levels, then the output may be able to switch if the radar signal crosses the switching level. After this switching event the output may be disabled until the value of the radar signal crosses one of the two hysteresis levels. If it crosses the upper hysteresis level, then the output may be armed again and can switch if the radar signal crosses the switching level. On the other hand, if the radar signal does not reach the upper hysteresis level, but the lower hysteresis level will be crossed again after a switching event, then the output may be allowed to switch, so that no tooth will be lost.

In speed sensing applications, the appearance of output signal pulses 722 (e.g. signal edges) may be synchronous with the movement of the movable object/part, e.g. signal edges of the output signal may be synchronous with the appearance of structures of the object such as reflecting structures (e.g. teeth or specific radar reflection structures mounted on the object). In other words, a signal edge corresponds to a specific structure such as the onset of a tooth etc. Thus, a number of output signal pulses within a certain time interval may be used for evaluating the speed of the movable part.

Other embodiments may additionally or alternative employ an analysis of frequency components present in a received/reflected radar signal. Analyzing the frequency spectrum, such as, for example, a spectral spread, may also yield information on the speed of the movable part. In some embodiments, the analyzing of the radar signal to determine rotational a speed information may be performed in the radar sensor, e.g. on the same chip. In some embodiments, instead of providing output signal pulses with edges synchronous to output signal edges, an absolute value of the speed determined at the radar sensor may be communicated to a control unit, e.g. utilizing digital or analog communication interfaces.

After having described several example embodiments for speed sensing, we will now also describe same examples related to measuring the position or rotation angle. Angle sensing may in embodiments include an unambiguous sensing of the rotation angle of a rotatable object, also referred to as absolute angle sensing. Absolute angle sensing provided in embodiments herein is capable to determine from the measurement taken for a specific rotation position the unique rotational angle of this object, e.g. an angle between 0 and 360°. In addition, absolute angle sensors may also be capable to provide continuous angle information. In contrast to incremental sensors, absolute angle sensors do not need to rely on previous sensed or stored historical information such as previous counts of angle increment with respect to a reference indication in order to provide the absolute rotational position information. Thus in some embodiments, when an absolute angle sensor is powered up it is capable to report its rotation position without the need for any further historical angle information. According to some embodiments, this may be achieved by providing a machine with a rotatably movable part having a rotationally asymmetric cross-section in a plane perpendicular to the movable part's rotational axis. In some embodiments, there may be a substantial rotational asymmetry. Thus, a ratio between a smallest and a largest diameter of the movable part in the plane may be smaller than 0.9 or even smaller than 0.5. Transceiver circuitry is configured to transmit a radio signal towards the movable part and to receive a reflection of the radio signal from the movable part. Evaluation circuitry is configured to determine a rotational position and/or a rotational speed of the movable part based on at least the received radio signal reflected from rotationally asymmetric movable part.

Figure 5A:
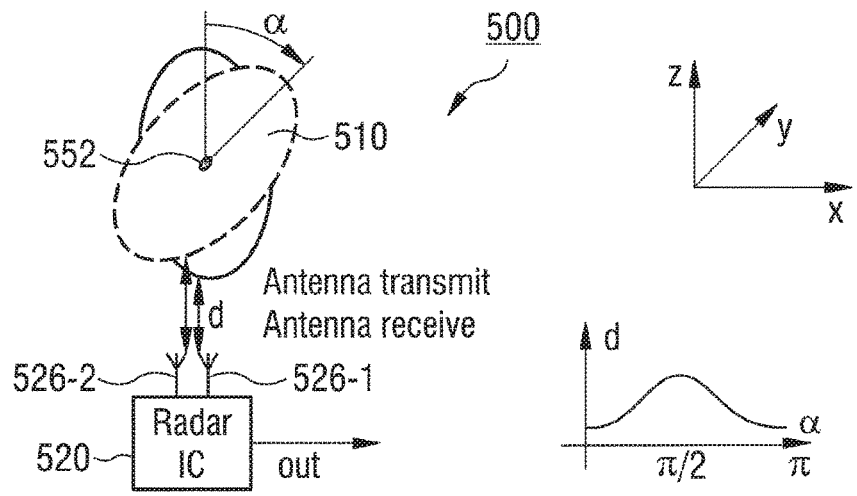
FIGS. 5a-5c show examples of radio wave based sensing systems using rotationally asymmetric movable parts.

FIG. 5a shows a setup 500 comprising transceiver circuitry 520 with a transmit antenna 526-1 and a receive antenna 526-2 in close proximity (smaller than 5 cm or even smaller than 1 cm in some embodiments) to a movable part 510 having an asymmetric cross-section in a plane perpendicular to the movable part's rotational axis 552. For example, the measured target 510 may be an asymmetric shaft (e.g. camshaft or crankshaft). In the illustrated example, the movable part's cross-section is elliptic. However, other rotationally asymmetric cross-sections are possible as well. Here, the antennas 526-1, 526-2 are positioned radially outward from movable part 510 such that the radio signal $s_t$ is reflected by an outer skin surface of movable part 510 extending parallel to the movable part's rotational axis.

As indicated in the example of FIG. 5a, the distance d between antennas 526-1 and 526-2 and skin surface is dependent on a rotational angle α of movable object 510. In a position, where the major semiaxis of the elliptic movable object 510 is parallel to the z-direction (α=0), the distance d corresponds to the shortest distance between antennas 526-1 and 526-2 and skin surface of movable object 510. In this position, transceiver circuitry 520 will detect the largest amplitude of the reflected signal. In a position, where the major semiaxis of elliptic movable object 510 is parallel to the x-direction (α=π/2), the distance d corresponds to the largest distance between antennas 526-1 and 526-2 and skin surface of movable object 510. In this position, transceiver circuitry 520 will detect the smallest amplitude of the reflected signal. In a further position, where the major semiaxis of elliptic movable object 510 is antiparallel to the z-direction (α=π), the distance d again corresponds to the largest distance between antennas 526-1 and 526-2 and skin surface of movable object 510. In this position, transceiver circuitry 520 will again detect the largest amplitude of the reflected signal, etc. Thus, it is possible to detect 180° unambiguous angular information based on the amplitude or the power of the reflected signal. Alternatively or additionally it is also possible to detect a frequency of the amplitude variations of the oscillating reflected signal. This frequency is indicative of a rotational speed ω of the movable object 510. The higher the frequency, the higher the rotational speed ω.

Figure 5B:
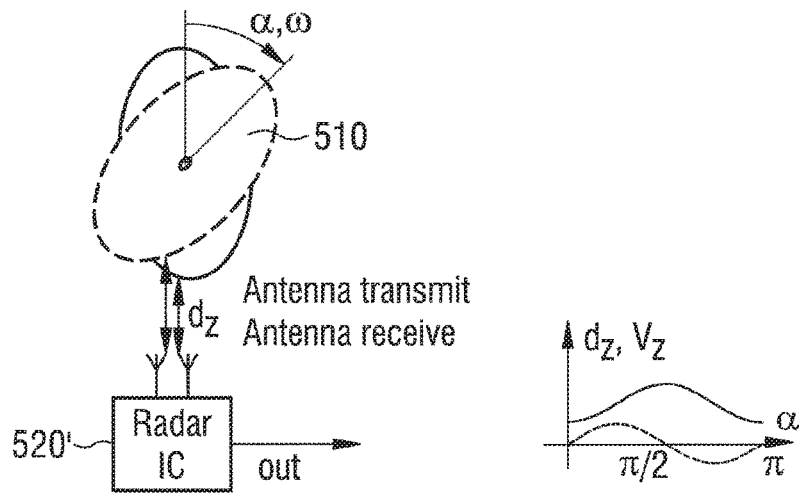

FIG. 5b illustrates an example that additionally or alternatively uses the Doppler effect for its measurements.

In a position, where the major semiaxis of elliptic movable object 510 is parallel to the z-direction (α=0), the distance d corresponds to the shortest distance between antennas 526 and skin surface of movable object 510. Further, a rotational speed component in z-direction is 0. Thus, there will be no Doppler shifted receive signal in this position. In a subsequent position, where the minor semiaxis of elliptic movable object 510 is parallel to the z-direction (α=π/4), the rotational speed component in z-direction is maximum. Thus, there will be a maximum Doppler shifted receive signal in this position. The higher the absolute value of the maximum Doppler frequency, the higher the rotational speed ω of the movable object 510. In a subsequent position, where the major semiaxis of elliptic movable object 510 is parallel to the x-direction (α=π/2), the distance d corresponds to the largest distance between antennas 526 and skin surface. In this position, the rotational speed component in z-direction is again 0. Thus, there will be no Doppler shifted receive signal in this position. In a subsequent position, where the minor semiaxis of elliptic movable object 510 is parallel to the x-direction (α=3/4π), the absolute value of rotational speed component in z-direction is again maximum, however, with different sign. Thus, there will be a maximum Doppler frequency shifted (with different sign) receive signal in this position.

Figure 5C:
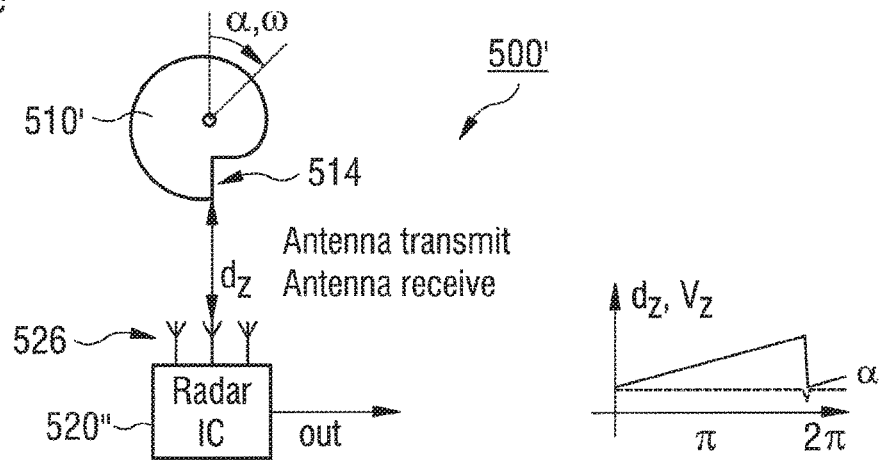

As can be seen from the example shown in FIG. 5c, the shape of the rotating target may also be asymmetric like the one in the drawing. Compared to the examples of FIGS. 5a, b, the rotational asymmetry is unambiguous in the example of FIG. 5c. That means that there may be no axis of symmetry for the movable object 510'. In this case the distance d can directly be converted into a 360° unambiguous rotation angle α. Further, the speed signal is directly proportional to the rotation speed ω and its sign is indicating the rotation direction.

As indicated in FIG. 5c, the radar sensor can also use an array of antennas 526 to form a directed antenna characteristic. Furthermore, it may use different antenna characteristics, for example, −10°, 0° and +10°, in order to observe different points on the target 510' simultaneously, which would for example allow to keep the speed and position measurement continuously ongoing when a discontinuity 514 of the target 510' appears in the focus of one of the focus directions.

It will be appreciated that due to the geometric shaping (rotational asymmetry) of the movable parts, the illustrated examples related to measuring the position or rotation angle can measure angles continuously and/or absolutely.

The skilled person having benefit from the present disclosure will appreciate that a radar sensor according to embodiments may additionally or alternatively measure distance or speed to a linearly moving object, for example, the bottom surface of the piston in a combustion engine. That is to say, embodiments are not only restricted to the detection of rotational movement but also to the detection of linear movement of movable parts.

To summarize, embodiments implement methods for position and/or a speed sensing alternative to magnetic sensor concepts. A high level flowchart of a method 600 is shown in FIG. 6.

Method 600 includes (linearly and/or rotationally) moving 610 an object relative to at least one antenna of a transceiver, wherein a distance between the antenna and the movable object is (and remains) less than 5 cm. Method 600 also includes transmitting 620 a radio signal from the transceiver towards the movable object and receiving 630, at the transceiver, a reflection of the radio signal from the movable object. In act 640, a position and/or a speed of the object is determined based on at least the received radio signal.

Embodiments of the present disclosure may be employed in in numerous industrial areas and especially in automotive electronics, where there is a need to electrically measure the rotation speed of rotating parts/wheels (e.g. ABS sensors, motor management, etc.). Embodiments may be used alternatively or additionally to semiconductor devices sensitive to magnetic fields (e.g., Hall sensors; GMR sensor, etc.). In the latter small magnets attached to or nearby the rotating object have to be used in addition to a magnetic sensor device. Further, the magnetic sensor has to be positioned very close to the rotating object because their sensitivity decreases very fast with distance to the magnetic field source. Allowable maximum distances are usually in the millimeter range. Modern semiconductor technologies make it possible to build small sized single chip radar transceivers (<<1 cm$^3$) capable to deliver radar beams and to sense small amplitude variations and/or phase/frequency shifts in the reflected radar signals. The present disclosure proposes to use such sensors for the measurement of rotational speeds of any rotating parts in close proximity of a few cm from the sensor. Thus, the distance to the rotating object could be significantly larger (at least cm-range). Further, no costly and cumbersome magnets are needed.

The description and drawings merely illustrate the principles of the disclosure. It will thus be appreciated that those skilled in the art will be able to devise various arrangements that, although not explicitly described or shown herein, embody the principles of the disclosure. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The invention claimed is:

1. A machine, comprising:
a movable part that is rotatably movable;
transceiver circuitry configured to transmit a radio signal towards the movable part and to receive a reflection of the radio signal from the movable part;
evaluation circuitry configured to determine a position or a speed of the movable part based on signal pulses, wherein the signal pulses are generated based on an amplitude of the received radio signal crossing a predetermined signal threshold; and
wherein a distance between an antenna, of the transceiver circuitry and the movable part is less than 5 cm.

2. The machine of claim 1, wherein the transceiver circuitry is configured to transmit the radio signal with an electrical power of less than 100 µW.

3. The machine of claim 1, wherein the transceiver circuitry comprises an antenna array and wherein the evaluation circuitry is further configured to determine a rotational direction of the movable part based on a combination of received signals of different antenna elements of the antenna array.

4. The machine of claim 1, wherein the transceiver circuitry and the evaluation circuitry are integrated in a common semiconductor package or chip.

5. The machine of claim 1, wherein an outermost diameter of an annular face of the movable part is continuous and extends along an unbroken circular path and comprises a plurality of alternating portions having an alternating electromagnetic reflectivity; and
the radio signal is positioned in front of the annular face of the movable part and the radio signal transmits in the direction of a rotational axis of the movable part.

6. The machine of claim 5, wherein the plurality of alternating portions comprise a first material associated with a first portion of the plurality of alternating portions and a second material associated with a second portion of the plurality of alternating portions, wherein the first and second materials have different electromagnetic reflectivity;
wherein adjacent sidewalls of alternating portions of the plurality of alternating portions directly contact one another; and
the plurality of alternating portions comprise at most two different reflectivities that alternate radially around the annular face.

7. The machine of claim 1, wherein the evaluation circuitry is configured to determine a rotational position or a rotational speed of the movable part based on at least the received radio signal.

8. The machine of claim 1, wherein the movable part comprises a rotationally symmetric cross-section in a plane perpendicular to a rotational axis of the movable part.

9. The machine of claim 1, wherein the movable part is a wheel, a disc, or a shaft.

10. The machine of claim 1, wherein the movable part comprises a rotationally asymmetric cross-section in a plane perpendicular to a rotational axis of the movable part.

11. The machine of claim 10, wherein a ratio between a smallest and a largest diameter of the movable part in the plane is smaller than 0.9.

12. The machine of claim 1, wherein the evaluation circuitry is configured to determine the position or the speed of the movable part based on variation of a power of the received signal or a phase difference between the transmitted and received radio signal.

13. The machine of claim 1, wherein the machine is a vehicle.

14. A machine, comprising:
a movable part;
transceiver circuitry configured to transmit a radio signal towards the movable part and to receive a reflection of the radio signal from the movable part;
evaluation circuitry configured to determine at least one of a position or a speed of the movable part based on at least the received radio signal,
wherein adjacent surface portions of the movable part have different materials of different electromagnetic reflectivity to cause different periodic amplitudes of the received radio signal.

15. The machine of claim 14, wherein an outermost diameter of the movable part is ring shaped and continuously extends along an unbroken path, and wherein the adjacent surface portions directly contact one another and comprise at most two portions associated with at most two electromagnetic reflectivities; and
a first electromagnetic reflectivity associated with a high output signal for the radio signal of a first surface portion that is metallic and differs from a second electromagnetic reflectivity associated with a low output signal for the radio signal of an adjacent second surface portion that is non-metallic.

16. The machine of claim 15, wherein the first electromagnetic reflectivity differs from the second electromagnetic reflectivity by more than 5% of the first or the second electromagnetic reflectivity.

17. The machine of claim 14, wherein a shortest distance between a first surface portion of the movable part and an antenna of the transceiver circuitry differs from a shortest distance between an adjacent second surface portion of the movable part and the antenna of the transceiver circuitry.

18. The machine of claim 17, wherein the shortest distance between the first surface portion and the antenna differs from the shortest distance between the adjacent second surface portion and the antenna by more than 5%.

19. The machine of claim 14, wherein a distance between an antenna of the transceiver circuitry and the movable part is less than 5 cm.

20. A machine, comprising:
a rotatably movable part having a rotationally asymmetric cross-section in a plane perpendicular to a rotational axis of the movable part, and having a plurality of teeth separated by a plurality of gaps along an outermost circumference of the movable part, wherein a first face associated with the plurality of gaps has a first electromagnetic reflectivity and a second face associated with the plurality of teeth has a second electromagnetic reflectivity that is different from the first electromagnetic reflectivity;

transceiver circuitry configured to transmit a radio signal towards the movable part and to receive a reflection of the radio signal from the movable part;

evaluation circuitry configured to determine at least one of a rotational position or a rotational speed of the movable part based on at least the received radio signal.

21. The machine of claim 20, wherein the plurality of teeth separated by a plurality of gaps associated with a gear shape comprise not more than two electromagnetic reflectivities, and the first face comprises a first surface material, and the second face comprises a second surface material that is different from the first surface material; and wherein a ratio between a smallest and a largest diameter of the movable part in the plane is smaller than 0.9.

22. The machine of claim 20, wherein a distance between an antenna of the transceiver circuitry and the movable part is less than 5 cm.

* * * * *